United States Patent
Cardinaux et al.

(10) Patent No.: US 10,564,923 B2
(45) Date of Patent: Feb. 18, 2020

(54) METHOD, SYSTEM AND ARTIFICIAL NEURAL NETWORK

(71) Applicant: Sony Corporation, Tokyo (JP)

(72) Inventors: Fabien Cardinaux, Stuttgart (DE); Michael Enenkl, Stuttgart (DE); Franck Giron, Waiblingen (DE); Thomas Kemp, Esslingen (DE); Stefan Uhlich, Renningen (DE)

(73) Assignee: SONY CORPORATION, Tokyo (JP)

( * ) Notice: Subject to any disclaimer, the term of this patent is extended or adjusted under 35 U.S.C. 154(b) by 740 days.

(21) Appl. No.: 14/666,848

(22) Filed: Mar. 24, 2015

(65) Prior Publication Data

US 2015/0278686 A1 Oct. 1, 2015

(30) Foreign Application Priority Data

Mar. 31, 2014 (EP) .................................. 14162930

(51) Int. Cl.
| | |
|---|---|
| *G06F 3/16* | (2006.01) |
| *G10L 15/16* | (2006.01) |
| *G06N 3/04* | (2006.01) |
| *G10H 1/36* | (2006.01) |
| *G10L 25/48* | (2013.01) |

(52) U.S. Cl.
CPC .......... *G06F 3/165* (2013.01); *G06N 3/0454* (2013.01); *G10H 1/361* (2013.01); *G10H 1/366* (2013.01); *G10L 15/16* (2013.01); *G10L 25/48* (2013.01); *G10H 2210/056* (2013.01); *G10H 2240/131* (2013.01); *G10H 2250/235* (2013.01); *G10H 2250/311* (2013.01); *G10H 2250/625* (2013.01)

(58) Field of Classification Search
CPC ................................................ G10H 2250/311
See application file for complete search history.

(56) References Cited

U.S. PATENT DOCUMENTS

| | | | | |
|---|---|---|---|---|
| 4,753,147 A | * | 6/1988 | Berardi ................. | G10D 3/046 84/267 |
| 8,541,676 B1 | | 9/2013 | Waldman | |
| 8,600,068 B2 | * | 12/2013 | DeBoer ................ | G10H 1/0091 381/118 |

(Continued)

FOREIGN PATENT DOCUMENTS

JP 5298649 9/2013

OTHER PUBLICATIONS

Durrieu, J-L. et al., "Musical audio source separation based on user-selected F0 track," Proc. 10th Intl. Conf. on Latent Variable Analysis and Signal Separation LVA/ICA (2012) 8 pp.*

(Continued)

*Primary Examiner* — Kakali Chaki
*Assistant Examiner* — Brian M Smith
(74) *Attorney, Agent, or Firm* — Xsensus LLP (57) ABSTRACT

It is disclosed a method comprising obtaining a target spectrum, obtaining a set of non-target spectra, the set of non-target spectra comprising one or more non-target spectra, summing the target spectrum and the set of non-target spectra to obtain a mixture spectrum, and training an artificial neural network by using the mixture spectrum as input of the neural network and by using a spectrum which is based on the target spectrum as desired output of the artificial neural network.

14 Claims, 6 Drawing Sheets

(56) References Cited

U.S. PATENT DOCUMENTS

| | | | | |
|---|---|---|---|---|
| 8,805,697 | B2* | 8/2014 | Visser | G10L 25/48 |
| | | | | 381/23 |
| 9,679,564 | B2* | 6/2017 | Daborn | G10L 15/26 |
| 2007/0083365 | A1* | 4/2007 | Shmunk | G10L 21/0272 |
| | | | | 704/232 |
| 2013/0031220 | A1* | 1/2013 | Moncavage | G06Q 10/10 |
| | | | | 709/219 |
| 2014/0260906 | A1* | 9/2014 | Welch | G10H 3/182 |
| | | | | 84/603 |
| 2015/0066499 | A1* | 3/2015 | Wang | G10L 25/30 |
| | | | | 704/233 |
| 2015/0242180 | A1* | 8/2015 | Boulanger-Lewandowski | |
| | | | | G06N 3/0445 |
| | | | | 700/94 |

OTHER PUBLICATIONS

Lu, X. et al., "Speech enhancement based on deep denoising autoencoder," 14th Annual Conf. of the Intl. Speech Comm. Assocn. (Interspeech 2013) 5 pp.*

Narayanan, A. et al., "Ideal ratio mask estimation using deep neural networks for robust speech recognition," 2013 Intl. Conf. on Acoustics, Speech, and Signal Processing (ICASSP 2013) pp. 7092-7096.*

Wang, Y. et al., "Towards scaling up classification-based speech separation," IEEE Transactions on Audioi, Speech, and Language Processing, vol. 21. No. 7 (Jul. 2013).*

Jehan, T., "Perceptual Synthesis Engine: An Audio-Driven Timbre Generator," MIT Thesis (2001) 75 pp. (Year: 2001).*

Le Groux, S., "A neural network principal component synthesizer for expressive control of musical sounds," Icram Thesis (2002) 70 pp. (Year: 2002).*

Starr, M., "Innitone converts your voice into instruments," CNET news article, downloaded from <www.cnet.com/news/imitone-converts-your-voice-into-instruments> (Mar. 13, 2014) 6 pp. (Year: 2014).*

Christian Uhle, et al., "Extraction of Drum Tracks From Polyphonic Music Using Independent Subspace Analysis", $4^{th}$ International Symposium on Independent Component Analysis and Blind Signal Separation (ICA2003), Apr. 2003, pp. 843-848.

* cited by examiner

METHOD, SYSTEM AND ARTIFICIAL NEURAL NETWORK

TECHNICAL FIELD

The present disclosure generally pertains to methods, artificial neural networks and systems comprising such artificial neural networks. The present disclosure also relates to Karaoke systems which enable a user to sing to a song.

TECHNICAL BACKGROUND

Known systems which are configured to extract a specific voice track from an audio mix depend on special properties of the original audio mix. For example they require the voice to be panned to the center or similar. Systems which allow cancelling or fading out the main vocals from a stereo mix are based on the premise that the voice is panned to center location for most of the popular music. Such systems however fail for vocals that are not panned to the center and they cannot remove instruments.

Also systems are known which extract data concerning notes, force, instruments, duration from an audio mix. This data is then used to resynthesize the audio mix. Such systems do not output the exact music played in the original mix but a resynthesized version of it, which may negatively affect sound quality and yield to a loss of the original timbre of the instruments.

SUMMARY

According to a first aspect it is disclosed a method comprising obtaining a target spectrum, obtaining a set of non-target spectra, the set of non-target spectra comprising one or more non-target spectra, summing the target spectrum and the set of non-target spectra to obtain a mixture spectrum, and training an artificial neural network by using the mixture spectrum as input of the neural network and by using a spectrum which is based on the target spectrum as desired output of the artificial neural network.

According to a further aspect it is disclosed a system comprising circuitry, the circuitry implementing an artificial neural network which is trained to extract audio of a target instrument from an input audio signal containing audio of a mixture of instruments.

According to a further aspect it is disclosed a system comprising circuitry, the circuitry implementing an artificial neural network which is trained to morph audio of a target instrument in an input audio signal containing audio of a mixture of instruments into corresponding audio of a replacement instrument.

According to a still further aspect it is disclosed a system comprising circuitry, the circuitry implementing an artificial neural network which is configured to receive an input spectrum, and to process the input spectrum to obtain an output spectrum, wherein the artificial neural network has been trained by using a mixture spectrum as input of the artificial neural network and by using a spectrum that is based on a target spectrum as desired output of the artificial neural network, the mixture spectrum corresponding to a sum of the target spectrum and a set of non-target spectra, the set of non-target spectra comprising one or more non-target spectra.

According to a still further aspect it is disclosed a system comprising a database for storing parameters of neural network, a user interface for selecting at least a target instrument, and circuitry, the circuitry implementing an artificial neural network which is configured according to parameters retrieved from the database and selected via the user interface, the artificial neural network being further configured to process a mixture spectrum which corresponds to input music in order to obtain an output spectrum based on the parameters selected via the user interface.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
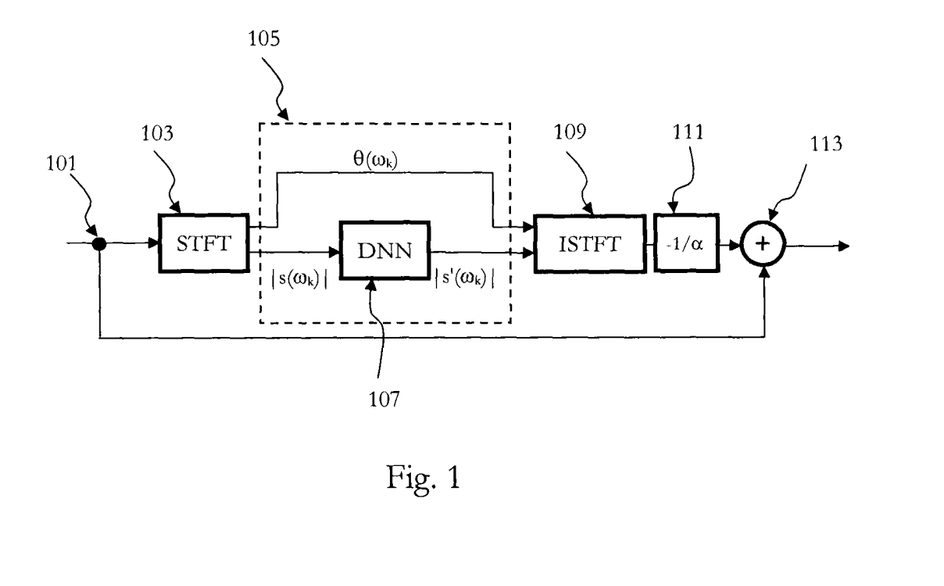
FIG. 1 schematically describes an embodiment of a system comprising an artificial neural network.

Before a detailed description of the embodiments under reference of FIG. 1, general explanations are made.

The embodiments described below disclose methods and systems for training and using an artificial neural network, for example a Deep Neuronal Network (DNN), to extract, suppress, or morph a target instrument in an audio mix.

In the following description of embodiments the term instrument refers to any identifiable sound source such as a music instrument, e.g. a violin, a trumpet, etc. In particular the term instrument should also cover voices, e.g. human voices. The term instrument should cover any sound sources such as natural instruments, synthesized instruments, sampled instruments, or the like. Further, the term instrument should also cover sound sources like drums or other percussive sound sources.

The term artificial neural network refers to any computational model that is capable of machine learning and pattern recognition, in particular to those computational models inspired by the human or animals central nervous systems (in particular the brain). Artificial neural network types may vary from those with only one or two layers of single direction logic, to complicated multi-input many directional feedback loops and layers.

Training an artificial neural network refers to any learning technique applied to an artificial neural network, using for example a cost function and/or any learning paradigm such as supervised learning, unsupervised learning and reinforcement learning. Training a neural network model may for example comprise selecting one model from the set of allowed models (or, in a Bayesian framework, determining a distribution over the set of allowed models) that minimizes a cost criterion. The skilled person can choose from numerous algorithms available for training neural network models.

Such models may for example be viewed as a straightforward application of optimization theory and statistical estimation.

The term spectrum as used in the embodiment below refers to any kind of spectral representation of an audio signal in the frequency domain. A (frequency) spectrum can for example be generated via Fourier Transform. A spectrum is typically represented by spectral phases and spectral amplitudes associated with specific frequencies. In the embodiments described below, a Short-Time Fourier Transform is used based on, for example, a Hamming window, to produce the frequency spectrum. Alternatively, any spectral analysis technique, Fourier transform, Fast Fourier transform, and/or wavelet technique may be used by the skilled person to implement the transformation of an audio signal from the time domain to the frequency domain or vice-versa.

In the embodiments described below it is illustrated a method which comprises obtaining a target spectrum, obtaining a set of non-target spectra, the set of non-target spectra comprising one or more non-target spectra, summing the target spectrum and the set of non-target spectra to obtain a mixture spectrum, and training an artificial neural network by using the mixture spectrum as input of the neural network and by using a spectrum which is based on the target spectrum as desired output of the artificial neural network.

The term target spectrum refers to a spectrum associated with a specific target instrument to be processed, for example extracted, suppressed or morphed in an audio mix. In a Karaoke system, the target instrument is typically the human voice of a singer.

The target spectrum may for example be obtained from an audio signal produced by a first instrument. For the target instrument, spectra may be generated which for example come from playing different notes, recording the audio signal and converting the audio signal to the frequency domain. Alternatively, the audio signal may also be artificially generated by synthesizing waveforms using a suitable sound font or by real recordings.

The term set of non-target spectra is meant to comprise sets with multiple spectra and/or sets which comprise only one single (non-target) instrument spectrum.

In a Karaoke system non-target instruments should remain in the audio mix. They are used to accompany the user of the Karaoke system who replaces the original voice which was removed or suppressed in the original audio mix.

The set of non-target spectra may for example comprise a non-target spectrum that is obtained from an audio signal produced by a second instrument. This second instrument, and possible other non-target instruments can be regarded as background instruments which should not be altered by the artificial neural network, i.e. they should not be extracted or morphed.

Non-target spectra may be generated by playing different notes, recording the audio signal and converting the audio signal to the frequency domain. Alternatively, the audio signal may also be artificially generated by synthesizing waveforms using a suitable sound font or by real recordings.

In some embodiments a single non-target spectrum may comprise sound of multiple non-target instruments.

Target spectra and non-target spectra might also be received from databases or via data transfer from an external source.

Summing the target spectrum and the set of non-target spectra refers to any technique which aggregates the target spectrum and non-target spectra to produce a resulting aggregated spectrum. Summing the target spectrum may for example be realized by adding spectral amplitudes.

According to one embodiment, the target spectrum is used as the desired output of the artificial neural network when training the artificial neural network. The output of the thus trained artificial neural network may be used in a system which extracts the target instrument from an audio mix, for example to then suppress or remove the target instrument from the original audio mix. This embodiment may be used to prepare an artificial neural network for use in a Karaoke system. The methods as described here may thus be used to create a music system, in which one of the tracks of a polyphonic music piece (an instrument, or the voice track) is removed or strongly suppressed, and the user can play/sing along instead. Such a system may be referred to as Karaoke system if the track in question is the voice track.

According to another embodiment, the method further comprises determining a morphing spectrum based on the target spectrum and based on a replacement spectrum, and using the morphing spectrum as desired output of the artificial neural network when training the artificial neural network.

The replacement spectrum may for example be obtained from an audio signal produced by a replacement instrument which produces audio that corresponds to that of the first instrument.

An artificial neural network which is trained using morphing spectra may enable the user to morph the sound of an instrument to another (represented by replacement spectra). For instance, it could be possible to transform a guitar to a flute.

The training of the artificial neural network may be based on spectral amplitudes and spectral phase. In the embodiments described below, the training is based on spectral amplitudes alone.

The obtaining a target spectrum, the obtaining a set of non-target spectra and the summing the target spectrum and the set of non-target spectra may be repeated multiple times. The training of the artificial neural network may thus be based on multiple mixture spectra and multiple target spectra. For each instrument spectra may be generated which for example come from playing different notes. A database of spectra for training the artificial neural network may be artificially generated by synthesizing waveforms using a suitable sound font or by real recordings.

Circuitry is also disclosed that implements artificial neural networks which have been trained according to the methods described above.

The term circuitry as used above comprises one or more programmable processors which are configured to run software. Further, circuitry may also comprise hardware realizations of artificial neural networks, for example physical neural networks in which electrically adjustable resistance material is used to emulate the function of a neural synapse. Circuitry also comprises chip design approaches (for example digital, analog, hybrid, and FPGA based) at neuronal level and neurochips realizing complete artificial neural networks.

In some embodiments the circuitry implements a Deep Neural Network (DNN). A deep neural network is a feed-forward artificial neural network that has more than one layer of hidden units or nodes (artificial neurons) between its inputs and its outputs. Deep Neural Networks allow for deep learning strategies and have a lower error rate. They may also allow for smart training approaches such as those disclosed in the embodiments.

As already described above, the methods can be used to produce a system which comprises circuitry, the circuitry implementing an artificial neural network which is trained to extract audio of a target instrument from an input audio signal containing audio of a mixture of instruments.

The methods may also be used to produce a system comprising circuitry, the circuitry implementing an artificial neural network which is trained to morph audio of a target instrument in an input audio signal containing audio of a mixture of instruments into corresponding audio of a replacement instrument.

The disclosed methods thus enable the user to not only to cancel some instrument, but also enable the user to morph some target instrument into another replacement instrument. Morphing a vocal track into a violin track may for example enable a violin player to e.g. learn to play the vocal track on the violin.

According to some embodiments, a system comprises circuitry, the circuitry implementing an artificial neural network which is configured to receive an input spectrum, and to process the input spectrum to obtain an output spectrum, wherein the artificial neural network has been trained by using a mixture spectrum as input of the artificial neural network and by using a spectrum that is based on a target spectrum as desired output of the artificial neural network, the mixture spectrum corresponding to a sum of the target spectrum and a set of non-target spectra, the set of non-target spectra comprising one or more non-target spectra.

The system may further comprise a time-to-frequency transformation unit which is configured to convert an input audio signal from a time domain to a frequency domain to obtain the input spectrum.

The system may further comprise a frequency-to-time transformation unit which is configured to convert the output spectrum from a frequency domain to a time domain to obtain an output audio signal.

The artificial neural network may for example process spectral amplitudes and spectral phases. In some embodiments, the artificial neural network processes spectral amplitudes only.

According to an embodiment, the system comprises a time-to-frequency transformation unit and a frequency-to-time transformation unit, wherein the time-to-frequency transformation unit is configured to convert an input audio signal from a time domain to a frequency domain to obtain spectral phases and spectral amplitudes, the artificial neural network is configured to receive the spectral amplitudes from the time-to-frequency transformation unit as input spectrum and to process the spectral amplitudes to obtain processed spectral amplitudes as output spectrum, the frequency-to-time transformation unit is configured to receive the spectral phases from the time-to-frequency transformation unit, to receive the processed spectral amplitudes from the artificial neural network, and to convert the spectral phases and the processed spectral amplitudes from a frequency domain to a time domain to obtain a processed audio signal.

The circuitry may further be configured to determine an output audio signal based on the input audio signal and the processed audio signal.

For example, the circuitry may further be configured to generate a target audio signal from the target spectrum, to weight the target audio signal by a damping factor, and to subtract the weighted target audio signal from the input audio signal to obtain the output audio signal.

Such a system may allow for providing an artificial neural network that extracts the sound of the wanted instrument.

The information about the extracted instrument may than be used to suppress the instrument in the original audio mix.

A perfect cancellation is not necessary for a successful Karaoke system. The disclosed system works also very well for reducing the instrument sound level of the target instrument, which is sufficient for playing along with the song while maintaining an overall good quality and also the timbre of the remaining mixture. Therefore, in some embodiments, the system does not completely cancel the target instrument from the mix.

The circuitry may further be configured to damp the processed audio spectrum. The damping may for example be realized by multiplying the audio signal with a damping factor in the time domain. Alternatively, the damping might also be realized in frequency domain.

According to some embodiments a system is provided which comprises a database for storing parameters of neural network, a user interface for selecting at least a target instrument, and circuitry, the circuitry implementing an artificial neural network which is configured according to parameters retrieved from the database and selected via the user interface, the artificial neural network being further configured to process a mixture spectrum which corresponds to input music in order to obtain an output spectrum based on the parameters selected via the user interface.

The disclosed systems allow reducing the loudness of a selected target instrument to a degree which preserves the quality of the produced audio content. That is, in some embodiment, for example in a Karaoke use case, it may not be aimed at a complete suppression of the target instrument in the audio mix. Instead, the loudness of the target instrument is only reduced to a defined threshold. This may help to increase the quality of the produced audio content while at the same time allow for good Karaoke scenarios.

The Karaoke output generated by such a system may keep the characteristics of the original mix (i.e., its timbre). Compared to other state of the art approaches, which require a special panning (e.g., of the vocals), vocals or instruments may be extracted independent of spatial position.

In some embodiments, the system may be implemented with a low computational complexity which allows real-time processing of the audio signal.

The different instruments and the switching of the main modus (Karaoke, morphing) may be accomplished by changing the parameters obtained from training the artificial neural network (such as adaptive weights, etc). For example, an artificial neural network may be trained for each of multiple target instruments and the parameters resulting from training may be stored in a database. When a particular target instrument is selected, e.g. by means of a user interface it is selected extraction of a violin, the parameters corresponding to this target instrument, the violin, may be retrieved from the database and the artificial neural network may be configured according to these retrieved parameters. The artificial neural network is thus configured to extract the selected target instrument. Once a user changes the selection by means of the user interface to a new target instrument, e.g. a trumpet, the corresponding parameters resulting from the respective trumpet training are obtained from the database and the artificial neural network is configured according to these parameters to extract the trumpet. If the user selects morphing vocals into a violin, then corresponding parameters which were obtained in a previous vocal-to-violin morphing training are obtained from the database and the artificial neural network is configured according to these parameters to morph a vocal track intro a violin track.

FIG. 1 schematically describes an embodiment of a system comprising an artificial neural network.

The system comprises a time-to-frequency transformation unit 103. This time-to-frequency transformation unit 103 implements a Short-Time Fourier Transform (STFT) to determine a frequency spectrum of local sections of an input audio signal as it changes over time. This Short-Time Fourier Transform is well known to the skilled person. The frequency spectrum of the input audio signal resulting from the Short-Time Fourier Transform is represented by spectral amplitudes $|s(\omega_k)|$ and by spectral phases $\theta(\omega_k)$, where $\omega_k$ represents a set of frequencies (k is an index which addresses a specific frequency). The Short-Time Fourier Transform may for example use a Hamming window to produce the frequency spectrum. Alternatively, any known wavelet technique may be used by the skilled person to implement the time-to-frequency transformation. An exemplifying time scale used for determining the Short-Time Fourier Transform may for example be 10 ms.

The spectral amplitudes $|s(\omega_k)|$ are fed to the input nodes of an artificial neural network 107. In this embodiment, the artificial neural network 107 is a Deep Neural Network (DNN). The artificial neural network 107 may have multiple layers, for example four layers, and it may for example have a number of nodes (artificial neurons) of about 1000.

The artificial neural network 107 has been trained as it is described in more detail with reference to FIG. 2 below to extract a target instrument from an audio mix. The artificial neural network 107 outputs at its output nodes processed spectral amplitudes $|s'(\omega_k)|$. These processed spectral amplitudes $|s'(\omega_k)|$ are fed to a frequency-to-time transformation unit 109, which furthermore receives the spectral phases $\theta(\omega_k)$ from time-to-frequency transformation unit 103. The frequency-to-time transformation unit 109 implements an Inverse Short-Time Fourier Transform (ISTFT) to determine an output audio signal from the spectral phases $\theta(\omega_k)$ and from the processed spectral amplitudes $|s'(\omega_k)|$. This output audio signal corresponds to the audio signal of the target instrument extracted from the input audio signal (audio mix).

The output audio signal is fed to a damping and inversion unit 111 which inverts the output audio signal (symbolised by a multiplication with −1) and damps the output audio signal by a predefined factor (symbolised by a multiplication with damping factor $1/\alpha$).

The damped and inverted output audio signal is fed to an aggregation unit 113. Aggregation unit 113 also receives the unprocessed input audio signal which is branched off by branching unit 101. Aggregation unit 113 adds the damped and inverted output audio signal (the extracted target instrument) to the input audio signal (the original audio mix) to thereby produce an audio signal in which the target instrument is suppressed.

The system of FIG. 1 can also be used to morph a target instrument into a replacement instrument. To this end, the artificial neural network 107 is configured according to the training described with reference to FIG. 3 below to produce a morphing spectrum from an input audio signal. Depending on the specifics of the training, the damping and inversion unit 111 may or may not be omitted. Aggregation unit 113 adds the morphing spectrum to the input audio signal (original audio mix) in order to obtain an audio signal in which the target instrument has been morphed into a replacement instrument.

In the frequency domain 105, it is thus extracted the spectrum of the target instrument with the help of a Deep Neural Network. This instrument spectrum can be suppressed from the mixture (maybe damped by a factor $1/\alpha$) after inverse Short-Time Fourier Transform. Alternatively, this can be done directly in the frequency domain using a masking approach.

This embodiment is based on the extraction of the selected instrument from the audio mix by using the Deep Neural Network, which was specifically trained previously to extract this instrument. Each instrument will thus have its corresponding Deep Neural Network.

Figure 2:
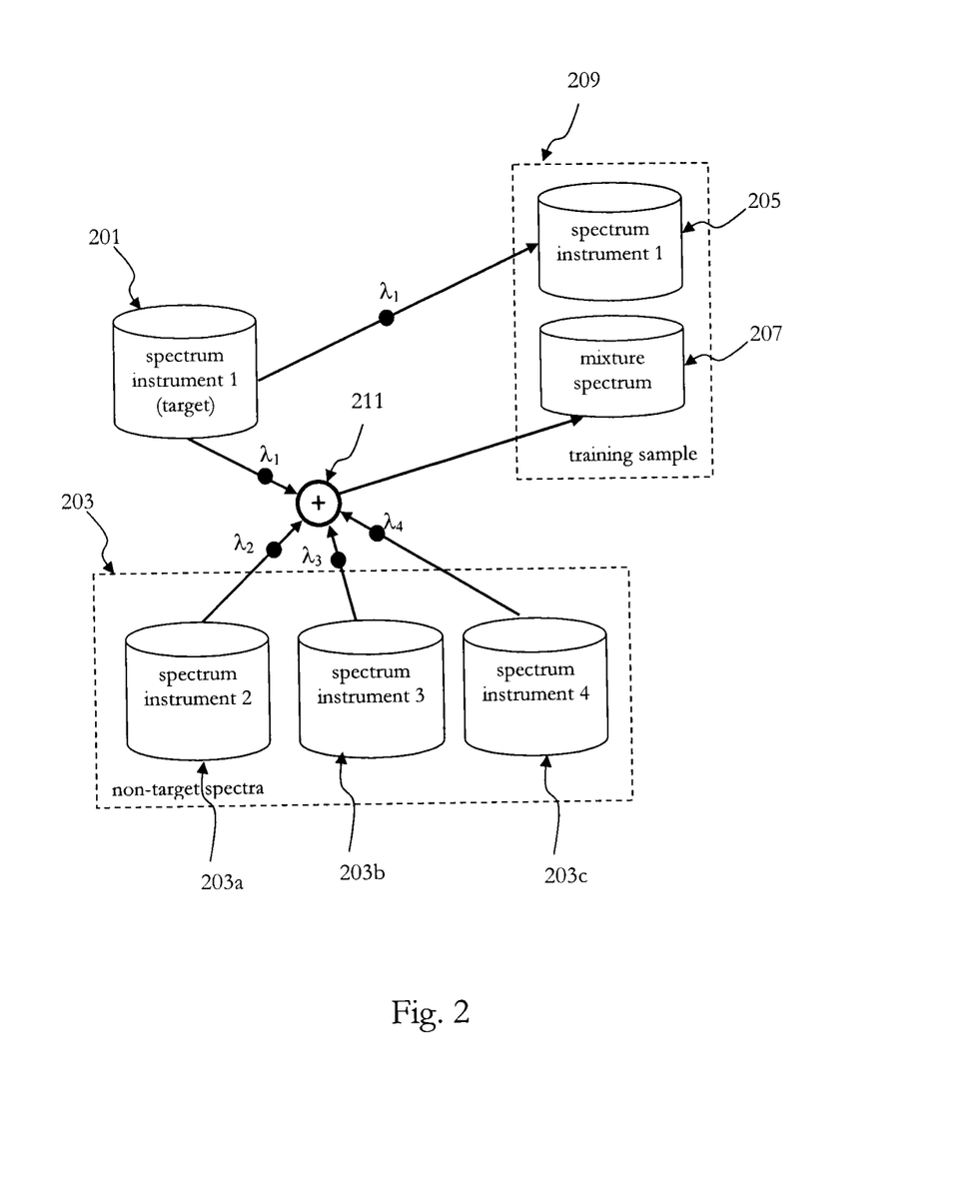
FIG. 2 schematically describes an embodiment of the training of an artificial neural network to extract a target instrument from an audio mix.

FIG. 2 schematically describes an embodiment of the training of an artificial neural network to extract a target instrument from an audio mix.

The embodiment is based on extracting a target instrument (first instrument) from an audio mix which is comprised of this target instrument and three non-target instruments (second, third and fourth instrument). The non-target instruments may be regarded as background instruments. The target instrument is played and audio samples are recorder to produce a set of spectra 201 of the target instrument. Likewise, each non-target instrument is played and audio samples are recorder to produce a set of spectra 203a, 203b, 203c of the first, second and third instruments.

The training comprises producing training samples 209. Each training sample 209 comprises a mixture spectrum 207 which represents an audio mix and an instrument spectrum 205 which represents the target instrument. In training the artificial neural network, the mixture spectrum 207 is used as input of the artificial neural network and the instrument spectrum 205 (representing the target instrument) is used as desired output of the artificial neural network. The artificial neural network is thus trained to reproduce instrument spectrum 205 (representing the target instrument) whenever the corresponding mixture spectrum 207 is fed to the input of the artificial neural network.

The mixture spectrum 207 is produced by aggregating, at 211, a spectrum 201 of the first instrument (the target instrument), a spectrum 203a of the second instrument, a spectrum 203b of the third instrument 203b, and a spectrum 203c of a fourth instrument. The aggregation, at 211, may for example be implemented by summing spectral amplitudes.

During the training, the input of the artificial neural network thus is the spectrum of a mixture of background instruments combined with the target instrument and the desired output of the artificial neural network is the spectrum of the target instrument. By this training, the artificial neural network "learns" to extract the target instrument from the mixture.

For each instrument spectra are generated which for example come from playing different notes. A database of spectra for training the artificial neural network may also be artificially generated by synthesizing waveforms using a suitable sound font or by real recordings.

This training procedure allows to generate a large number of training sample, necessary to train such a DNN model, since the synthesised mixture can be generated by any combination of instruments and notes available.

FIG. 2 describes the principles of the training process with regard to a single training sample. The actual training process may however comprise a large or even very large number of training samples. The training samples may be produced by playing the instrument at a variety of different pitches, with varying loudness, with a variety of different articulations, etc, to produce a large number of spectra 201, 203a, 203b and 203c on which the training may be based.

FIG. 2 also describes that when producing training samples 209, the spectrum 201 of the target instrument may be weighted with an amplitude $\lambda_1$. Likewise, when aggregating the instrument spectra, at 211, each instrument spectrum may be weighted with an amplitude $\lambda_1, \lambda_2, \lambda_3, \lambda_4$. The $\lambda$s may denote random amplitudes that are used for the synthesis.

Figure 3:
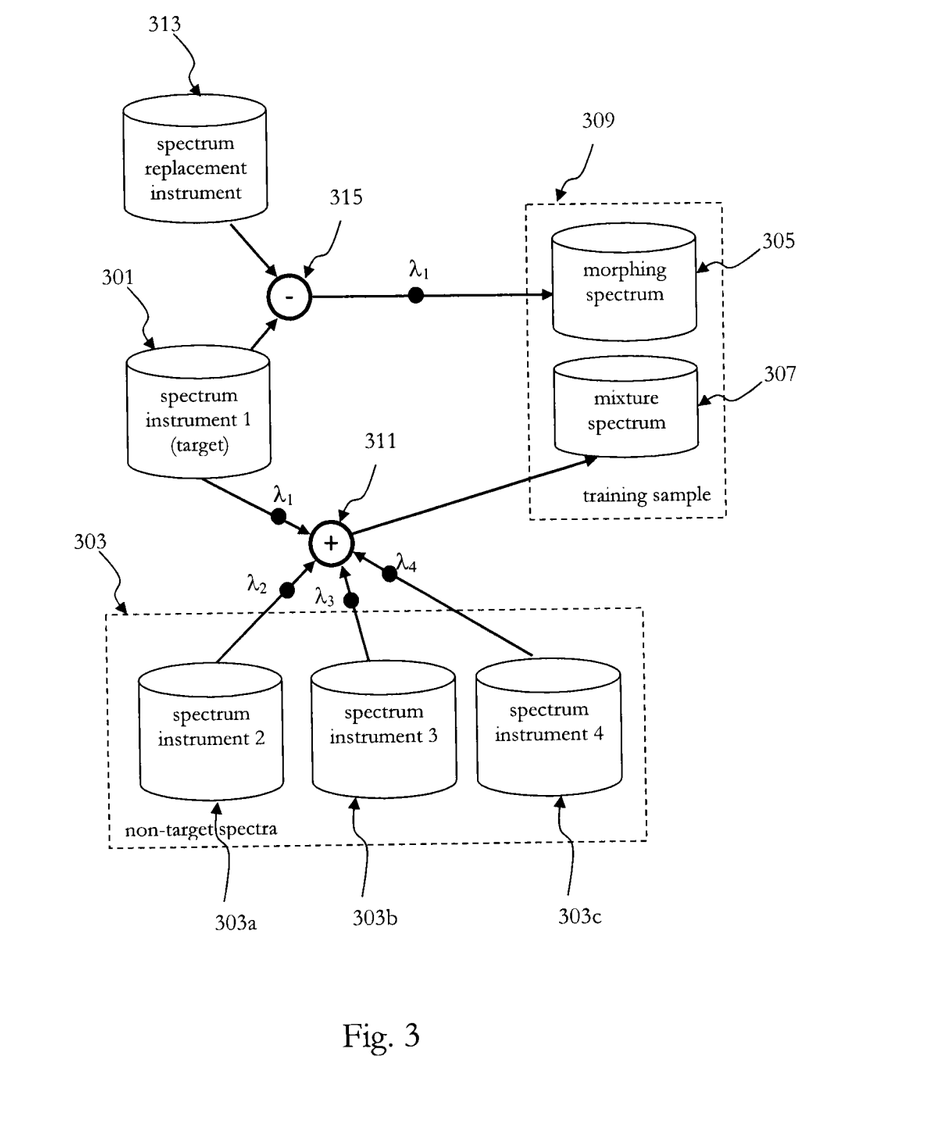
FIG. 3 schematically describes a further embodiment of the training of an artificial neural network to morph a target instrument of an audio mix into a replacement instrument.

FIG. 3 schematically describes a further embodiment of the training of an artificial neural network. In this embodiment the artificial neural network is trained to morph a target instrument of an audio mix into a replacement instrument. As in the embodiment of FIG. 2, a training sample 209 comprises a mixture spectrum 207 which is used as input when training the artificial neural network and which is produced by aggregating, at 311, a spectrum 301 of a first instrument, a spectrum 302 of a second instrument, a spectrum 303 of a third instrument, and a spectrum 304 of a fourth instrument. The spectrum 301 of instrument 1 is considered as the target which is to be morphed. The second instrument, the third instrument and the fourth instrument may again be regarded as non-target instruments 303, or background instruments.

In the embodiment of FIG. 3, when instrument 1 (the target instrument) is played and recorded to produce spectra 301, a replacement instrument is correspondingly played and recorded to produce replacement spectra 313. At 315 a difference spectrum is produced based on a spectrum 301 of the first instrument (target) and based on a corresponding spectrum 313 of the replacement instrument. The difference spectrum may for example be obtained by subtraction. The difference spectrum is used in the training sample 309 as a morphing spectrum 305. The artificial neural network is thus trained to produce the morphing spectrum 305 whenever a corresponding mixture spectrum is fed to the inputs of the artificial neural network. The artificial neural network is thus trained to replace notes and articulations played by the target instrument or phonemes in singing/talking by corresponding notes and articulations played by the replacement instrument.

As in the embodiment of FIG. 2 the difference spectrum may be weighted with a weighting factor $\lambda_1$ when producing the morphing spectrum. Likewise, when aggregating the instrument spectra, at 311, each instrument spectrum may be weighted with a corresponding weighting factor $\lambda_1, \lambda_2, \lambda_3, \lambda_4$.

An artificial neural network may thus be trained to output the spectral difference between the target instrument and the desired replacement instrument using training samples where both instruments have played the same notes. If multiple instruments should be processed, the artificial neural network is trained for each combination to be morphed (e.g. voice to flute, guitar to strings). Each combination of instruments will result in a specific set of parameters for the artificial neural network.

Figure 4:
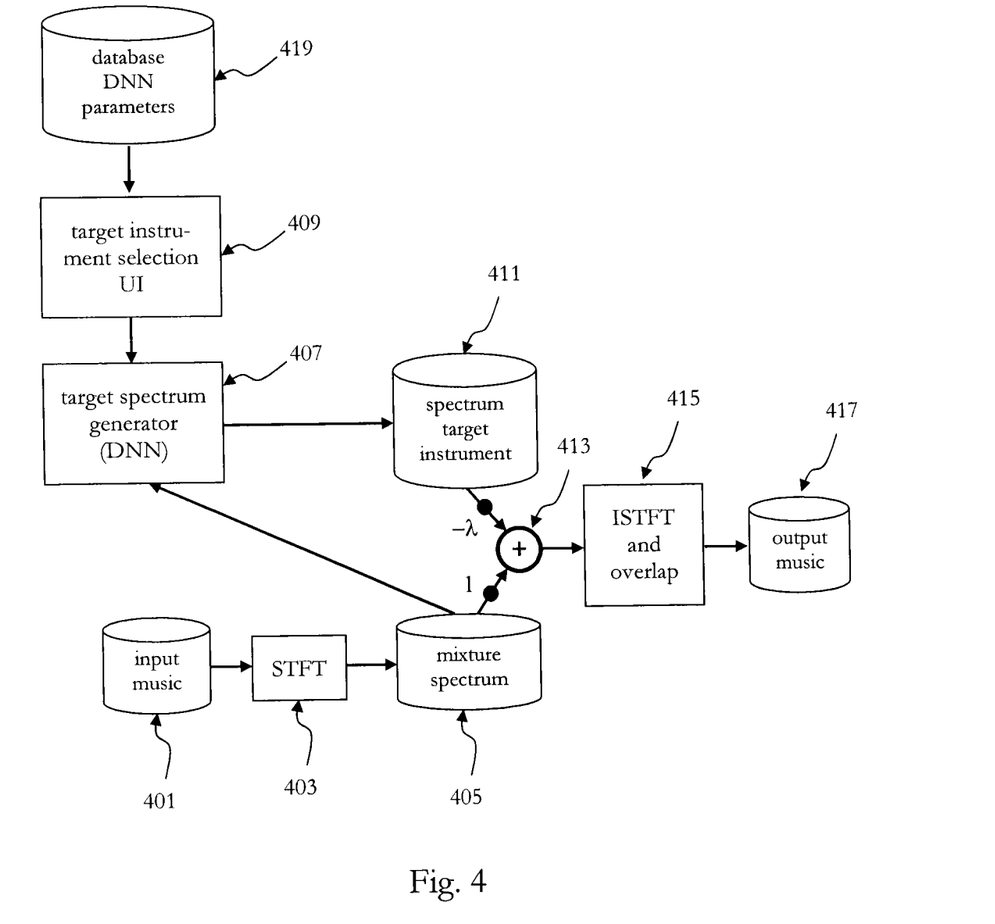
FIG. 4 discloses an embodiment of a system which comprises an artificial neural network in order to extract an instrument from an audio mix or morph an instrument of an audio mix intro a replacement instrument.

FIG. 4 discloses an embodiment of a system which comprises an artificial neural network in order to extract an instrument from an audio mix or morph an instrument of an audio mix intro a replacement instrument. The system comprises a time-to-frequency transformation unit 403, here a Short-time Fourier Transform (STFT) which is configured to produce a mixture spectrum 405 from an input audio signal 401, here a polyphonic piece of music. The mixture spectrum 405 is fed to an artificial neural network 407, here a Deep Neural Network (DNN). A target instrument selection user interface 409 is configured to provide parameters for the artificial neural network 407 according to a user selection. The parameters for the artificial neural network 407 may be retrieved from a database 419 which stores, for each instrument to be extracted (or instrument combination to be morphed, e.g. voice to flute, guitar to strings) a specific set of parameters for the Deep Neural Network. The target instrument selection user interface 409 configures the artificial neural network 407 with the specific parameters of the instrument (or instrument combination) selected by the user. According to these setting, the artificial neural network 407 processes the mixture spectrum 405 to obtain a corresponding target spectrum 411 which represents the extracted target instrument (respectively the morphing spectrum if an instrument combination was selected). The mixture spectrum 405 and the target spectrum 411 are summed in an aggregation unit 413, whereby the target spectrum is inverted and damped (represented by the multiplication by $-\lambda$) so that the aggregation results in suppressing the target spectrum 411 from the mixture spectrum 405. The resulting aggregation spectrum is passed is converted from the frequency domain to the time domain in frequency-to-time transformation unit 415, here an Inverse Short-time Fourier Transform (ISTFT) to produce an output audio signal, here an output music 417 in which the target instrument has been suppressed (or morphed, if an instrument combination was selected). Optionally, as indicated in FIG. 4, the frequency-to-time transformation unit 415 may also compensate overlaps.

In general, the switching between the different modes (Karaoke or morphing) may be accomplished by exchanging the parameters of the artificial neural network 407 which were learned offline for each instrument or morphing pair. This enables a fast and easy switching of the mode or suppressed/morphed instruments without changing the system setup (cf. FIG. 1).

The disclosed approach may be realized by neural network forward passes in the frequency domain and may therefore be processed in real-time.

Figure 5:
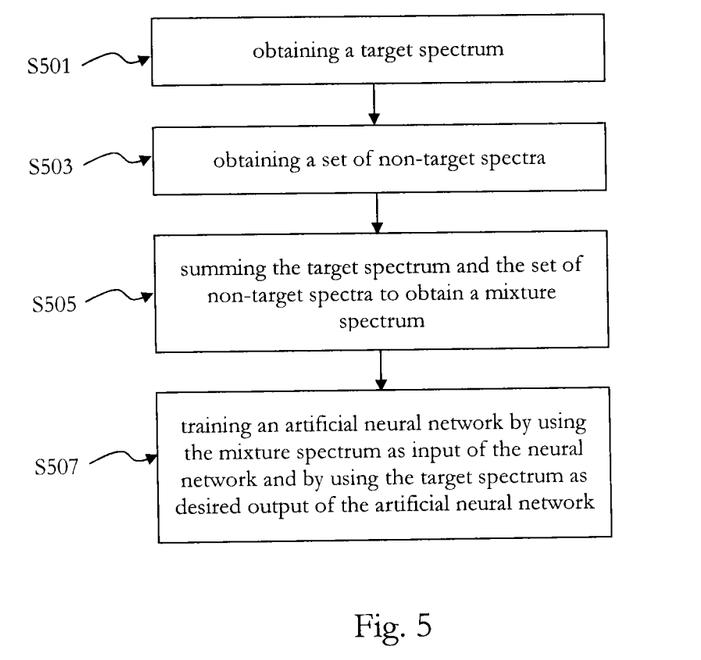
FIG. 5 discloses an embodiment of a method for extracting an instrument of an audio mix.

FIG. 5 discloses an embodiment of a method for extracting an instrument of an audio mix. At S501, a target spectrum is obtained. At S503, a set of non-target spectra is obtained, the set of non-target spectra comprising one or more non-target spectra. At S505, the target spectrum and the set of non-target spectra is summed to obtain a mixture spectrum. At S507, an artificial neural network is trained by using the mixture spectrum as input of the neural network and by using a spectrum which is based on the target spectrum as desired output of the artificial neural network.

Figure 6:
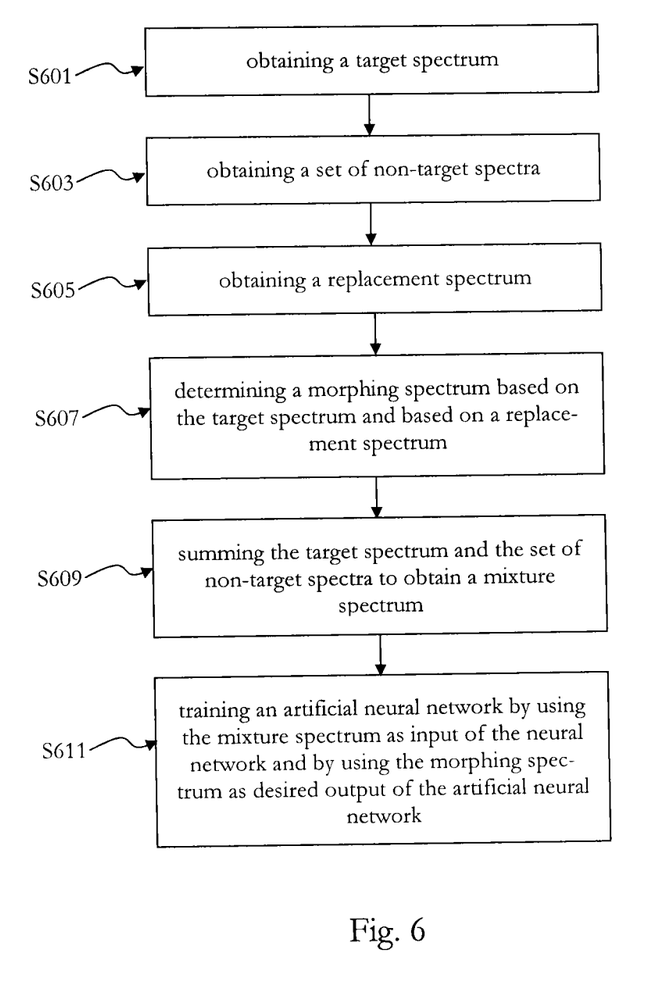
FIG. 6 discloses an embodiment of a method for morphing an instrument of an audio mix into a replacement instrument.

FIG. 6 discloses an embodiment of a method for morphing an instrument of an audio mix into a replacement instrument. At S601, a target spectrum is obtained. At S603, a set of non-target spectra is obtained, the set of non-target spectra comprising one or more non-target spectra. At S605, a replacement spectrum is obtained. At S607, a morphing spectrum is determined based on the target spectrum and based on a replacement spectrum. At S609, the target spectrum and the set of non-target spectra is summed to obtain a mixture spectrum. At S611, an artificial neural network is trained by using the mixture spectrum as input of the neural network and by using the morphing spectrum as desired output of the artificial neural network.

It should be recognized that the embodiments describe methods with an exemplary ordering of method steps. The specific ordering of method steps is however given for illustrative purposes only and should not be construed as binding. For example the ordering of S501 and S503 in the embodiment of FIG. 5 may be exchanged. Also, the ordering of S601, S603 and S605 in the embodiment of FIG. 6 may be exchanged. Further, also the ordering of S607 and S609 in the embodiment of FIG. 6 may be exchanged. Other changes of the ordering of method steps may be apparent to the skilled person.

It should also be noted that the division of the units as described in the embodiments above is only made for illustration purposes and that the embodiments are not limited to any specific division of functions in specific units. For instance, units 409, 407, 403 and 415 of the embodiment of FIG. 4 could be implemented by a respective programmed processor, field programmable gate array (FPGA) and the like.

The methods disclosed in this specification may be implemented as a computer program causing a computer and/or circuitry, such as processor to perform the method, when being carried out on the computer and/or circuitry. In some embodiments, also a non-transitory computer-readable recording medium is provided that stores therein a computer program product, which, when executed by circuitry, such as the processor described above, causes the method described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the invention described above are implemented, at least in part, using software-controlled data processing apparatus, it will be appreciated that a computer program providing such software control and a transmission, storage or other medium by which such a computer program is provided are envisaged as aspects of the present invention.

Note that the present technology can also be configured as described below.

(1) A method, comprising
obtaining a target spectrum,
obtaining a set of non-target spectra, the set of non-target spectra comprising one or more non-target spectra,
summing the target spectrum and the set of non-target spectra to obtain a mixture spectrum, and
training an artificial neural network by using the mixture spectrum as input of the neural network and by using a spectrum which is based on the target spectrum as desired output of the artificial neural network.
(2) The method of (1) in which the target spectrum is obtained from an audio signal produced by a first instrument, and the set of non-target spectra comprises a non-target spectrum that is obtained from an audio signal produced by a second instrument.
(3) The method of (1) or (2) further comprising using the target spectrum as desired output of the artificial neural network when training the artificial neural network.
(4) The method of (1) or (2), further comprising
determining a morphing spectrum based on the target spectrum and based on a replacement spectrum,
using the morphing spectrum as desired output of the artificial neural network when training the artificial neural network.
(5) The method of (4) in which the target spectrum is obtained from an audio signal produced by a first instrument, and in which the replacement spectrum is obtained from an audio signal produced by a replacement instrument which produces audio that corresponds to that of the first instrument.
(6) The method of anyone of (1) to (5) in which the training of the artificial neural network is based on spectral amplitudes.
(7) The method of anyone of (1) to (6) in which the obtaining a target spectrum, the obtaining a set of non-target spectra and the summing the target spectrum and the set of non-target spectra is repeated multiple times and in which the training of the artificial neural network is based on multiple mixture spectra and multiple target spectra.
(8) Artificial neural network which has been trained according to the method of anyone of (1) to (7).
(9) A system comprising circuitry, the circuitry implementing an artificial neural network which is trained to extract audio of a target instrument from an input audio signal containing audio of a mixture of instruments.
(10) A system comprising circuitry, the circuitry implementing an artificial neural network which is trained to morph audio of a target instrument in an input audio signal containing audio of a mixture of instruments into corresponding audio of a replacement instrument.
(11) A system comprising circuitry, the circuitry implementing an artificial neural network which is configured to
receive an input spectrum, and to
process the input spectrum to obtain an output spectrum,
wherein the artificial neural network has been trained by using a mixture spectrum as input of the artificial neural network and by using a spectrum that is based on a target spectrum as desired output of the artificial neural network, the mixture spectrum corresponding to a sum of the target spectrum and a set of non-target spectra, the set of non-target spectra comprising one or more non-target spectra.
(12) The system of (11) further comprising a time-to-frequency transformation unit, wherein the time-to-frequency transformation unit is configured to convert an input audio signal from a time domain to a frequency domain to obtain the input spectrum.
(13) The system of (11) or (12) further comprising a frequency-to-time transformation unit, wherein the frequency-to-time transformation unit is configured to convert the output spectrum from a frequency domain to a time domain to obtain an output audio signal.
(14) The system of anyone of (11) to (13) in which the artificial neural network processes spectral amplitudes.
(15) The system of anyone of (11) to (14) further comprising a time-to-frequency transformation unit and a frequency-to-time transformation unit, wherein
the time-to-frequency transformation unit is configured to convert an input audio signal from a time domain to a frequency domain to obtain spectral phases and spectral amplitudes,
the artificial neural network is configured to receive the spectral amplitudes from the time-to-frequency transformation unit as input spectrum and to process the spectral amplitudes to obtain processed spectral amplitudes as output spectrum,
the frequency-to-time transformation unit is configured to receive the spectral phases from the time-to-frequency transformation unit, to receive the processed spectral amplitudes from the artificial neural network, and to convert the spectral phases and the processed spectral amplitudes from a frequency domain to a time domain to obtain a processed audio signal.
(16) The system of anyone of (11) to (15) in which the circuitry is further configured to damp the processed audio spectrum.
(17) The system of anyone of (11) to (16) in which the circuitry is further configured to determine an output audio signal based on the input audio signal and the processed audio signal.
(18) The system of (17) in which the circuitry is further configured to generate a target audio signal from the target spectrum, to weight the target audio signal by a damping factor, and to subtract the weighted target audio signal from the input audio signal to obtain the output audio signal.

(19) The system of anyone of (11) to (18), used in a Karaoke machine.

(20) A system comprising
a database for storing parameters of neural network,
a user interface for selecting at least a target instrument, and
circuitry, the circuitry implementing an artificial neural network which is configured according to parameters retrieved from the database and selected via the user interface, the artificial neural network being further configured to process a mixture spectrum which corresponds to input music in order to obtain an output spectrum based on the parameters selected via the user interface.

The invention claimed is:

1. A method for an interactive entertainment performed by artificial neural network circuitry implementing an artificial neural network, the method comprising:
obtaining a target spectrum from an audio signal produced by a first instrument;
obtaining one or more non-target spectra;
obtaining a replacement spectrum from an audio signal produced by a replacement instrument which produces audio that corresponds to audio of the first instrument;
determining a morphing spectrum based on the target spectrum and the replacement spectrum;
generating a mixture spectrum by aggregating (i) the target spectrum and (ii) the one or more non-target spectra by the artificial neural network circuitry;
training the artificial neural network circuitry with the mixture spectrum as input and the morphing spectrum as desired output of the artificial neural network circuitry;
receiving an input spectrum representing a polyphonic audio including multiple tracks;
processing the input spectrum to obtain an output spectrum using the trained artificial neural network circuitry by suppressing one of the multiple tracks in the polyphonic audio, replacing the suppressed one with another track selected via a user interface by a user, and preserving the rest of the multiple tracks as unaltered, wherein the one of the multiple tracks is deliberately suppressed, using the artificial neural network of the trained artificial neural network circuitry, incompletely to be only reduced to a defined threshold; and
enabling the user, by the trained artificial neural network circuitry, to morph sound of an instrument to another instrument, the morphing including at least one of morphing (1) a guitar track into a flute track, (2) a vocal track into a violin track, (3) a vocal track into a flute track, and (4) a guitar track into a string instrument track that is not a guitar track.

2. The method of claim 1, wherein the one or more non-target spectra comprises a non-target spectrum that is obtained from an audio signal produced by a second instrument.

3. The method of claim 1 in which the training of the artificial neural network circuitry is based on spectral amplitudes.

4. The method of claim 1 further comprising:
repeatedly summing the target spectrum and the one or more non-target spectra multiple times, wherein the training of the artificial neural network circuitry is based on multiple mixture spectra and multiple target spectra.

5. A system for an interactive entertainment, the system comprising:
artificial neural network circuitry implementing an artificial neural network, the artificial neural network circuitry configured to:
obtain a target spectrum from an audio signal produced by a first instrument;
obtain one or more non-target spectra;
obtain a replacement spectrum from an audio signal produced by a replacement instrument which produces audio that corresponds to audio of the first instrument;
determine a morphing spectrum based on the target spectrum and the replacement spectrum;
generate a mixture spectrum by aggregating (i) the target spectrum and (ii) the one or more non-target spectra;
train the artificial neural network circuitry with the mixture spectrum as input and the morphing spectrum as desired output of the artificial neural network circuitry;
receive an input spectrum representing a polyphonic audio including multiple tracks;
process the input spectrum to obtain an output spectrum using the trained artificial neural network circuitry configured to suppress one of the multiple tracks in the polyphonic audio, replace the suppressed one with another track selected via a user interface by a user, and preserve the rest of the multiple tracks as unaltered, wherein the one of the multiple tracks is deliberately suppressed, using the artificial neural network of the trained artificial neural network circuitry, incompletely to be only reduced to a defined threshold; and
enable the user, by the trained artificial neural network circuitry, to morph sound of an instrument to another instrument, the morphing including at least one of morphing (1) a guitar track into a flute track, (2) a vocal track into a violin track, (3) a vocal track into a flute track, and (4) a guitar track into a string instrument track that is not a guitar track.

6. The system of claim 5 wherein the artificial neural network circuitry is further configured to convert an input audio signal from a time domain to a frequency domain to obtain the input spectrum.

7. The system of claim 5 wherein the artificial neural network circuitry is further configured to convert the output spectrum from a frequency domain to a time domain to obtain an output audio signal.

8. The system of claim 5 in which the artificial neural network circuitry processes spectral amplitudes.

9. The system of claim 5 wherein the artificial neural network circuitry is further configured to:
convert an input audio signal from a time domain to a frequency domain to obtain spectral phases and spectral amplitudes,
receive the spectral amplitudes as input spectrum,
process the spectral amplitudes to obtain processed spectral amplitudes as output spectrum,
receive the spectral phases,
receive the processed spectral amplitudes from the artificial neural network, and
convert the spectral phases and the processed spectral amplitudes from a frequency domain to a time domain to obtain a processed audio signal.

10. The system of claim 9, in which the artificial neural network circuitry is further configured to damp the processed audio signal.

11. The system of claim 5 in which the artificial neural network circuitry is further configured to determine an output audio signal based on an input audio signal and the processed input spectrum.

12. The system of claim 11 in which the artificial neural network circuitry is further configured to:
generate a target audio signal from the target spectrum, weight the target audio signal by a damping factor, and subtract the weighted target audio signal from the input audio signal to obtain the output audio signal.

13. The system of claim 12, used in a Karaoke machine.

14. A system for an interactive entertainment, the system comprising:
a database for storing parameters of a neural network;
a user interface for a user to select at least a track; and
neural network circuitry implementing the neural network, the neural network circuitry configured according to the parameters retrieved from the database and selected via the user interface, the neural network circuitry configured to:
obtain a target spectrum from an audio signal produced by a first instrument;
obtain one or more non-target spectra;
obtain a replacement spectrum from an audio signal produced by a replacement instrument which produces audio that corresponds to audio of the first instrument;
determine a morphing spectrum based on the target spectrum and the replacement spectrum;
generate a mixture spectrum by aggregating (i) the target spectrum and (ii) the one or more non-target spectra;
train the neural network circuitry with the mixture spectrum as input and the morphing spectrum as desired output of the neural network circuitry;
receive an input spectrum representing a polyphonic audio including multiple tracks;
process the input spectrum to obtain an output spectrum using the trained neural network circuitry configured to suppress one of the multiple tracks in the polyphonic audio, replace the suppressed one with the track selected via the user interface by the user, and preserve the rest of the multiple tracks as unaltered, wherein the one of the multiple tracks is deliberately suppressed incompletely, using the artificial neural network of the trained artificial neural network circuitry, incompletely to be only reduced to a defined threshold; and
enable the user, by the trained neural network circuitry, to morph sound of an instrument to another instrument, the morphing including at least one of morphing (1) a guitar track into a flute track, (2) a vocal track into a violin track, (3) a vocal track into a flute track, and (4) a guitar track into a string instrument track that is not a guitar track.

* * * * *